United States Patent
Larsson

(10) Patent No.: US 10,895,873 B2
(45) Date of Patent: Jan. 19, 2021

(54) MACHINE HEALTH MONITORING OF ROTATING MACHINERY

(71) Applicant: Aktiebolaget SKF, Gothenburg (SE)

(72) Inventor: Per-Erik Larsson, Lulea (SE)

(73) Assignee: Aktiebolaget SKF, Gothenburg (SE)

( * ) Notice: Subject to any disclaimer, the term of this patent is extended or adjusted under 35 U.S.C. 154(b) by 0 days.

(21) Appl. No.: 15/962,264

(22) Filed: Apr. 25, 2018

(65) Prior Publication Data

US 2019/0332102 A1    Oct. 31, 2019

(51) Int. Cl.
*G05B 23/02* (2006.01)
*G01M 13/00* (2019.01)

(52) U.S. Cl.
CPC ......... *G05B 23/0283* (2013.01); *G01M 13/00* (2013.01); *G05B 23/027* (2013.01); *G05B 23/0227* (2013.01)

(58) Field of Classification Search
CPC ............ G05B 23/0283; G05B 23/0227; G05B 23/027; G01M 13/00
USPC .......................................................... 340/679
See application file for complete search history.

(56) References Cited

U.S. PATENT DOCUMENTS

| | | | | |
|---|---|---|---|---|
| 5,461,570 A | * | 10/1995 | Wang ........................ | A61L 2/24 700/110 |
| 5,691,909 A | * | 11/1997 | Frey .................... | G05B 19/4069 700/159 |
| 5,903,796 A | * | 5/1999 | Budnik .............. | G03G 15/5037 399/26 |
| 5,922,963 A | * | 7/1999 | Piety ................... | G01M 13/028 702/183 |
| 5,949,676 A | * | 9/1999 | Elsley .................. | G05B 23/024 700/79 |
| 6,681,633 B2 | | 1/2004 | Schultz | |
| 7,383,097 B2 | * | 6/2008 | Jalluri ................ | G05B 19/4065 700/159 |
| 8,174,402 B2 | * | 5/2012 | Bouse ................ | G05B 19/4065 340/635 |
| 8,803,461 B2 | * | 8/2014 | Tiwari .................... | H02P 23/14 318/459 |
| 9,778,080 B2 | * | 10/2017 | Garvey, III ............ | G01D 18/00 |

(Continued)

FOREIGN PATENT DOCUMENTS

EP    1154237 A1    11/2001

*Primary Examiner* — John A Tweel, Jr.
(74) *Attorney, Agent, or Firm* — Garcia-Zamor Intellectual Property Law; Ruy Garcia-Zamor; Bryan Peckjian

(57) ABSTRACT

An auto-diagnosis system is provided. The auto-diagnosis system executes a volume of machine health monitoring of machine parts by an analysis of measurements of the machine parts to detect defects as early as possible. The auto-diagnosis system includes a sensor in communication with the machine parts, a processor, and memory storing software for an auto-diagnosis alarm handling of the machine parts. The software is executable by the processor to cause the auto-diagnosis system to set alarm levels for each measurement point of the machine parts based on a mean of a group of condition indicator values and a predetermined number of standard deviations above the mean, detect an alarm with respect to the measurements of the machine parts and the alarms levels, automatically adjust an alarm level corresponding to the alarm, and automatically adjust the alarm level to a new state based on the measurements respective to the alarm.

20 Claims, 2 Drawing Sheets

(56) References Cited

U.S. PATENT DOCUMENTS

| | | |
|---|---|---|
| 2004/0117150 A1 | 6/2004 | Cuddihy et al. |
| 2008/0243328 A1 | 10/2008 | Yu et al. |
| 2009/0312930 A1 | 12/2009 | Nakakita et al. |
| 2012/0025958 A1 | 2/2012 | Chuang |
| 2017/0009045 A1 | 1/2017 | Sawa |

* cited by examiner

MACHINE HEALTH MONITORING OF ROTATING MACHINERY

FIELD OF THE INVENTION

This invention relates to machine health monitoring.

BACKGROUND

Machine diagnostics are utilized to implement machine health monitoring. A main objective in machine diagnostics is to detect defects in machinery as early as possible. Yet, conventional machine diagnostics include a number of shortcomings. With respect to complex machinery, i.e., machinery with many components interacting, the machine diagnostics may detect multiple defects without being able to find a main problem or a root cause. With respect to complex situations, i.e., machinery with running conditions that are constantly changing, the machine diagnostics may trigger false alarms or fail to detect a defect.

SUMMARY

In accordance with one or more embodiments, an auto-diagnosis system is provided. The auto-diagnosis system is for executing a volume of machine health monitoring of one or more machine parts by an analysis of measurements of the one or more machine parts to detect defects therein as early as possible. The auto-diagnosis system includes at least one sensor in communication with the one or more machine parts; at least one processor; and at least one memory storing thereon software for an auto-diagnosis alarm handling of the one or more machine parts. The software includes at least an alarm level module being executable by the at least one processor to cause the auto-diagnosis system to: set, by the alarm level module, alarm levels for each measurement point of the one or more machine parts based on a mean of a group of condition indicator values and a predetermined number of standard deviations above the mean, detect, by the alarm level module, an alarm with respect to the alarms levels and the measurements of the one or more machine parts provided by the at least one sensor, automatically adjust, by the alarm level module, an alarm level corresponding to the alarm, and automatically adjust, by the alarm level module, the alarm level to a new state based on the measurements respective to the alarm.

In accordance with one or more embodiments of the auto-diagnosis system embodiment above, the alarm level module can set the alarm levels after a learning or testing time period.

In accordance with one or more embodiments of any of the auto-diagnosis system embodiments above, the alarm level module can utilize M out of N alarm logic to detect the alarm.

In accordance with one or more embodiments of any of the auto-diagnosis system embodiments above, the alarm level module can adjust the alarm level to the new state based on the mean of the group of the condition indicator values plus a predetermined number of standard deviations above that mean.

In accordance with one or more embodiments of any of the auto-diagnosis system embodiments above, the auto-diagnosis system can execute an analysis to determine whether a defect is present with respect to the alarm.

In accordance with one or more embodiments of any of the auto-diagnosis system embodiments above, the alarm level module can adjust the alarm level to the new state when maintenance has been performed on the one or more machine parts and a defect has been eliminated.

In accordance with one or more embodiments of any of the auto-diagnosis system embodiments above, the one or more modules can include a machine part module that monitors kinematics of the one or more machine parts, the kinematics being utilized to determine defect frequencies of the measurements of the one or more machine parts.

In accordance with one or more embodiments of any of the auto-diagnosis system embodiments above, the one or more modules can include a diagnosis rules module that determines and stores diagnosis rules based on generating a condition indicator value for each defect and in combination with amplitudes of the measurements of the one or more machine parts at defined frequencies based on kinematics.

In accordance with one or more embodiments of any of the auto-diagnosis system embodiments above, the one or more modules can include a diagnosis trend module that determines and stores a series of condition indicator values outputted by the at least one processor upon a processing of historical measurement data stored in the at least one memory.

In accordance with one or more embodiments of any of the auto-diagnosis system embodiments above, a rotating machinery of a wind turbine system or a locomotive system can include the one or more machine parts.

An auto-diagnosis method for executing a volume of machine health monitoring of one or more machine parts by an analysis of measurements of the one or more machine parts to detect defects therein as early as possible. The auto-diagnosis method implemented by an auto-diagnosis system including at least one sensor in communication with the one or more machine parts, at least one processor, and at least one memory storing thereon software for an auto-diagnosis alarm handling of the one or more machine parts. The software including at least an alarm level module being executable by the at least one processor to cause the auto-diagnosis system to implement the auto-diagnosis method including setting, by the alarm level module, alarm levels for each measurement point of the one or more machine parts based on a mean of a group of condition indicator values and a predetermined number of standard deviations above the mean; detecting, by the alarm level module, an alarm with respect to the alarms levels and the measurements of the one or more machine parts provided by the at least one sensor; automatically adjusting, by the alarm level module, an alarm level corresponding to the alarm; and automatically adjusting, by the alarm level module, the alarm level to a new state based on the measurements respective to the alarm.

In accordance with one or more embodiments of the auto-diagnosis method embodiment above, the alarm level module can set the alarm levels after a learning or testing time period.

In accordance with one or more embodiments of any of the auto-diagnosis method embodiments above, the alarm level module can utilize M out of N alarm logic to detect the alarm.

In accordance with one or more embodiments of any of the auto-diagnosis method embodiments above, the alarm level module can adjust the alarm level to the new state based on the mean of the group of the condition indicator values plus a predetermined number of standard deviations above that mean.

In accordance with one or more embodiments of any of the auto-diagnosis method embodiments above, the auto-diagnosis system can execute an analysis to determine whether a defect is present with respect to the alarm.

In accordance with one or more embodiments of any of the auto-diagnosis method embodiments above, the alarm level module can adjust the alarm level to the new state when maintenance has been performed on the one or more machine parts and a defect has been eliminated.

In accordance with one or more embodiments of any of the auto-diagnosis method embodiments above, the one or more modules can include a machine part module that monitors kinematics of the one or more machine parts, the kinematics being utilized to determine defect frequencies of the measurements of the one or more machine parts.

In accordance with one or more embodiments of any of the auto-diagnosis method embodiments above, the one or more modules can include a diagnosis rules module that determines and stores diagnosis rules based on generating a condition indicator value for each defect and in combination with amplitudes of the measurements of the one or more machine parts at defined frequencies based on kinematics.

In accordance with one or more embodiments of any of the auto-diagnosis method embodiments above, the one or more modules can include a diagnosis trend module that determines and stores a series of condition indicator values outputted by the at least one processor upon a processing of historical measurement data stored in the at least one memory.

In accordance with one or more embodiments of any of the auto-diagnosis method embodiments above, a rotating machinery of a wind turbine system or a locomotive system can include the one or more machine parts.

BRIEF DESCRIPTION OF THE DRAWINGS

The invention will now be described, by way of example, with reference to the accompanying drawings, in which.

DETAILED DESCRIPTION

Figure 1:
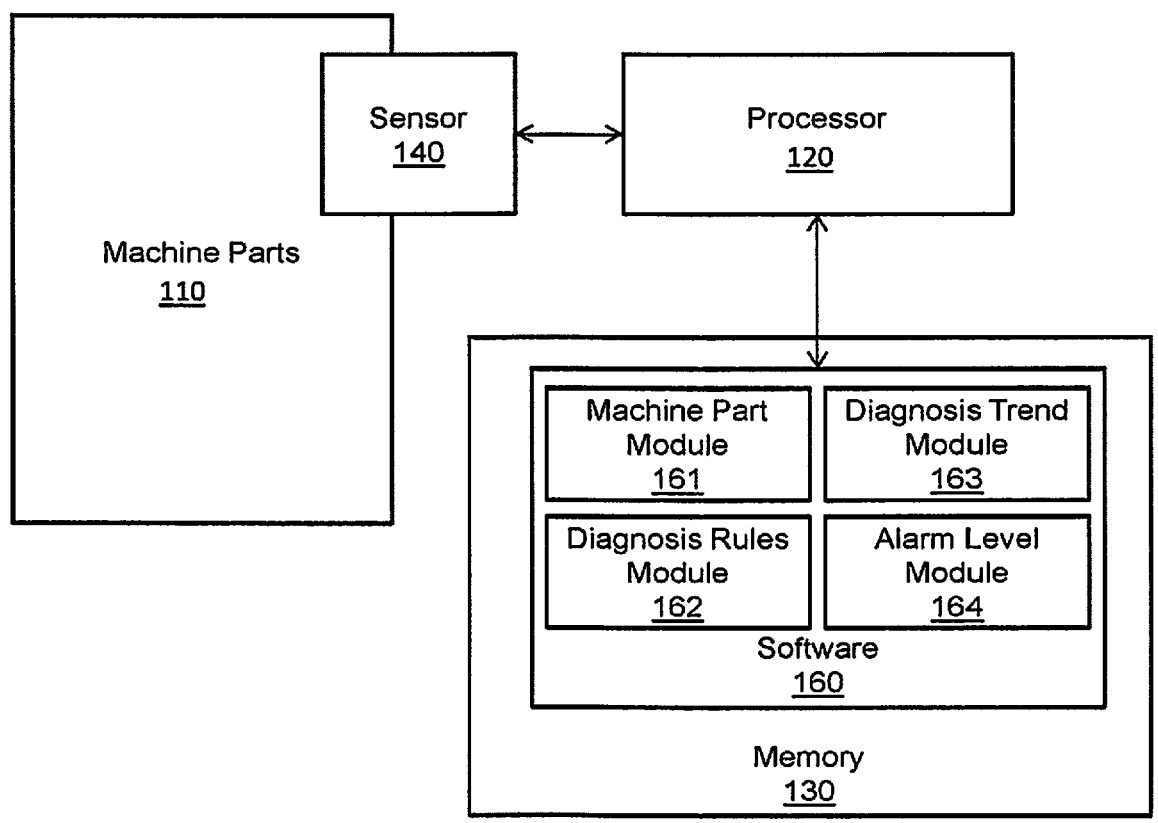
FIG. 1 depicts an auto-diagnosis system implementing machine diagnostics in accordance with one or more embodiments.

The following detailed description refers to the accompanying drawings. Wherever possible, the same reference numbers are used in the drawings and the following description refers to the same or similar parts. While several exemplary embodiments and features of the present disclosure are described herein, modifications, adaptations, and other implementations are possible, without departing from the spirit and scope of the present disclosure. Accordingly, the following detailed description does not limit the present disclosure. Instead, the proper scope of the disclosure is defined by the appended claims.

FIG. 1 depicts an auto-diagnosis system 100 implementing machine diagnostics in accordance with one or more embodiments. The auto-diagnosis system 100 comprises one or more machine parts 110 (e.g., a rotating machinery and components therein), at least one processor 120, at least one memory 130, and at least one sensor 140. Thus, as shown in FIG. 1, the auto-diagnosis system 100 includes processing capability in the form of the at least one processor 120, storage capability in the form of the at least one memory 130, and input/output mechanisms in the form of at least one sensor 140.

In general, as the auto-diagnosis system 100 increases a volume of machine health monitoring, the auto-diagnosis system 100 automatically increases an analysis of measurements to detect defects in the one or more machine parts 110 as early as possible, to increase detection reliability, and to increase accuracy on failure prediction. In turn, the technical effects and benefits of the auto-diagnosis system 100 include performing measurements and analysis at a right moment from a production point of view, so that parts can be ordered upon detection (rather than keeping a large spare part inventory). The technical effects and benefits of the auto-diagnosis system 100 also include maximizing an ability to detect a type of defect(s) present, maximizing an ability to classify defects with respect to severity, and minimizing the false positives (false alarms). Thus, embodiments described herein are necessarily rooted in the at least one processor 120, the at least one memory 130, and the at least one sensor 140. Further, the embodiments described herein are necessarily rooted in the auto-diagnosis system 100 to perform proactive operations to overcome problems specifically arising in the realm of machine diagnostics are utilized to implement machine health monitoring (e.g., these problems include the detecting multiple defects without being able to find a main problem or a root cause, triggering false alarms, and/or failing to detect a defect).

The one or more machine parts 110 are portions of a machinery and/or rotating machinery being monitored. Examples of the machinery and/or the rotating machinery include, but are not limited to, locomotive systems, wind turbine systems, automotive systems, and industrial systems. Examples of the one or more machine parts 110 within the machinery and/or the rotating machinery include, but are not limited to, drivetrain, axles, bogies with axles, axleboxes, traction motors, wheels, gear wheels, impellers, bearing, stators, rotors, electrical rotor, turbines, shafts, and windings.

The at least one processor 120 can comprise one or more central processing units (CPU(s)), also referred to as processing circuits, coupled via a system bus to the at least one memory 130, at least one sensor 140, and various other components. The at least one processor 120 executes a software 160 of the auto-diagnosis system 100. The software 160 of the auto-diagnosis system 100 may be stored in the at least one memory 130.

The at least one memory 130 can include a read only memory (ROM) and a random access memory (RAM). The ROM is coupled to the system bus and may include a basic input/output system (BIOS), which controls certain basic functions of the system. The RAM is read-write memory coupled to the system bus for use by the at least one processor 120. The at least one memory 130 is an example of a tangible storage medium readable by the at least one processor 120, where the software 160 is stored as instructions for execution by the at least one processor 120 to cause the auto-diagnosis system 100 to operate, such as is described herein. In one embodiment, a portion of the diagnosis system 100 and the at least one memory 130 can collectively store an operating system, a firmware, the software 160 discussed herein, or the like, to coordinate the functions of the various components shown in FIG. 1.

The at least one sensor 140 can comprise one or more transducers that monitor and/or detect machine component conditions of the one or more machine parts 110. The at least one sensor 140 can comprise one or more input/output (I/O) adapters coupled to the system bus that communicates the machine component conditions to the at least one memory 130, the at least one processor 120, and/or any other similar component. Examples of the at least one sensor 140 include, but are not limited to, accelerometers, thermocouples, strain gauges, and microphones. In accordance with one or more embodiments, the at least one sensor 140 can determine machine component conditions based on information about the machine components such as a pitch diameter, a rolling element diameter, a number of rolling elements, a contact angle etc. of a bearing; a number of teeth of a gear wheel; a number of blades and/or vanes of an impeller; and a number of rotor bars of an electrical rotor. Further, temperature, vibrations, stress, and the like can also be determined by the at least one sensor 140. The at least one sensor 140 further can provide the machine component conditions to the at least one processor 120 and the at least one memory 130 as analog and/or digital waveforms.

The software 160 of the auto-diagnosis system 100 may further comprise one or more modules, such as a machine part module 161, a diagnosis rules module 162, a diagnosis trend module 163, and an alarm level module 164.

The machine part module 161 of the software 160 of the auto-diagnosis system 100 determines and/or calculates kinematics of the one or more machine parts 110 being monitored based on actual process values, speeds, etc. taken synchronously with the measurements. In accordance with one or more embodiments, kinematics are utilized to determine defect frequencies of the one or more machine parts 110 (based on receiving the analog and/or digital waveforms from the at least one sensor 140) using a shaft speed of the one or more machine parts 110 at a time when measurements are taken.

In this regard, the machine part module 161 determines dynamically all relevant defect frequencies for each measurement (provided by the at least one sensor 140). In the case of rotating machinery, the machine part module 161 determines dynamically all relevant defect frequencies for each measurement based on a shaft speed measured simultaneously with a vibration measurement.

The diagnosis rules module 162 of the software 160 of the auto-diagnosis system 100 determines and stores diagnosis rules based on generating a condition indicator value for each defect (all relevant defect). These diagnosis rules can also be predetermined and can combine amplitudes (based on receiving the analog and/or digital waveforms from the at least one sensor 140) at defined frequencies based on kinematics. Note that for each measurement, a defined set of diagnosis rules are used to determine a set of condition indicator values. The condition indicator values enables the auto-diagnosis system 100 to react upon defined defects in the one or more machine parts 110.

Generating the condition indicator values by the diagnosis rules module 162 of the software 160 can include receiving the analog and/or digital waveforms from the at least one sensor 140 and adding individual peaks of a frequency spectrum to form a root means square (RMS). In accordance with one or more embodiments, a root sum square (RSS) determination can be utilized in addition to the Root Means Square (RMS) determination. The diagnosis rules module 162 of the software 160 can also determine the condition indicator values as an overall percentage (0%) and as the 0% of a speed following band. The technical effects and benefits of the software 160 can include having operating machine component conditions influences all peaks in a frequency range, including operating machine component conditions where defects are detected. To determine the condition indicator values as the 0% of the speed following band, the diagnosis rules module 162 sets a range covering the peaks of the analog and/or digital waveforms being used in the condition indicator determination, which reduces an influence from a running condition of the one or more machine parts 110.

Each condition indicator value reflects a condition of the one or more machine parts 110 with respect to a particular defect. It should be noted that several condition indicator values, each one designed to detect a defect, can be calculated from each measurement (provided by the at least one sensor 140). As such, there is at least one condition indicator value for each measurement.

The diagnosis trend module 163 of the software 160 of the auto-diagnosis system 100 determines and stores a series of condition indicator values outputted by the at least one processor 120 upon the processing of historical measurement data stored in the at least one memory 130. Historical measurement data comprises operational information obtained over time during the operation of the one or more machine parts 110 and test simulation data simulates identifying a system reaction to distinct operational settings.

The alarm level module 164 of the software 160 of the auto-diagnosis system 100 determines and stores a definition of a threshold level for the condition indicator values (when a defect has been detected). The alarm level module 164 can automatically determine the threshold levels based on the processing of historical measurement data. The alarm level module 164 can set or adjust the alarm level based on the mean of a group of condition indicator values plus a predetermined number of standard deviations above that mean. The predetermined number of standard deviations can be a fixed value set by a user input or a result of a calculation of the standard deviation divided by the mean. For example, if the result is greater than 0.3, the alarm level is 3 standard deviations above the mean. Further, if the result is less than 0.1, the alarm level is 5 standard deviations above the alarm level. Between 0.1 and 0.3 the multiplicator is linear between 3 and 5.

The alarm level module 164 can determine a new threshold when an alarm is triggered, and subsequently initiate a new learning period. As the new learning period concludes, the alarm level module 164 can determine a new threshold. In accordance with one or more embodiments, any learning periods can be taken before the alarm occurred so that the new alarm level can be calculated immediately upon the alarm. If the condition indicator values decrease significantly, the threshold may be recalculated by the alarm level module 164. With this functionality, the threshold is always set at a level to detect a significant increase of the condition indicator values. The length of the new learning period can be adjusted automatically by the auto-diagnosis system 100.

The alarm level module 164 of the software 160 of the auto-diagnosis system 100 can also perform M out of N alarm logic. M out of N alarm logic comprises when an M out of the N last condition indicator values are above the threshold (with M and N being integers), then an alarm is triggered. In accordance with one or more embodiments, M out of N alarm logic can also comprise Most out of N, where if the majority of the condition indicator values are above the threshold, then an alarm is triggered. The values of M and N can reflect an analysis/evaluation period used. If, for example, the analysis/evaluation period is one hour and the data is checked twice per day a suitable M and N setting may be 4 and 7. The length of the analysis/evaluation period can be adjusted automatically by the auto-diagnosis system 100.

Figure 2:
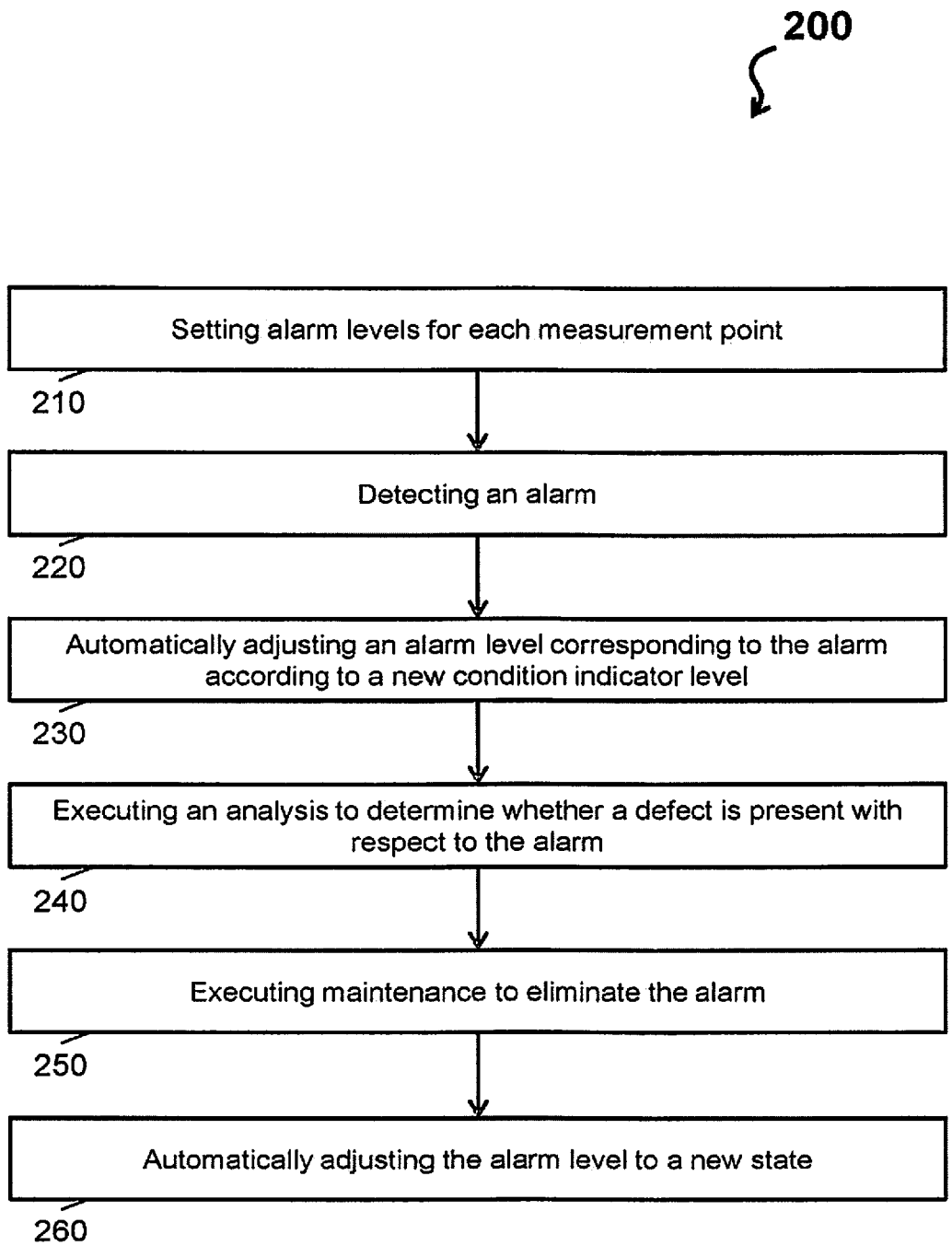
FIG. 2 depicts a process flow of an auto-diagnosis alarm handling process of an auto-diagnosis system in accordance with one or more embodiments.

FIG. 2 depicts a process flow 200 of the auto-diagnosis system 100 in accordance with one or more embodiments. The process flow 200 is an example of an auto-diagnosis alarm handling process of the auto-diagnosis system 100.

The process flow 200 begins at block 210, the auto-diagnosis system 100 sets alarm levels for each measurement point. For example, the alarm level module 164 can set or adjust the alarm level based on the mean of a group of condition indicator values plus a predetermined number of standard deviations above that mean. Note that the alarm level module 164 can set the alarm level after a learning or testing time period.

At block 220, the auto-diagnosis system 100 detects an alarm (e.g., the alarm is being reported by the alarm level module 164). The alarm is detected with respect to the measurements of the one or more machine parts and the alarms levels set in block 210. The alarm level module 164 of the software 160 of the auto-diagnosis system 100 can detect the alarm via M out of N alarm logic.

At block 230, the auto-diagnosis system 100 automatically adjusts an alarm level corresponding to the alarm. The alarm level module 164 can set or adjust the alarm level based on the mean of a group of condition indicator values plus a predetermined number of standard deviations above that mean. Thus, when the alarm of block 220 is detected, the alarm level can be reset by the alarm level module 164 to a new condition indicator level corresponding to the alarm.

At block 240, the auto-diagnosis system 100 executes an analysis to determine whether a defect is present with respect to the alarm. This analysis can be user interactive, and if the analysis shows a defect, then the process flow 200 proceed to block 250. At block 250, the auto-diagnosis system 100 detects executes maintenance to eliminate the alarm. Note that any performance of maintenance on the one or more machine parts 110 can be automatically detected when the level drops significantly after repair.

At block 260, the auto-diagnosis system 100 automatically adjusts the alarm level to a new state (e.g., when maintenance has been performed and the defect has been eliminated, the alarm level is automatically adjusted to the new situation). The new state can comprise when the alarm level module 164 determines a new threshold when an alarm is triggered, and subsequently initiates a new learning period. As the new learning period concludes, the alarm level module 164 can determine a new threshold. If the condition indicator values decrease significantly, the threshold may be recalculated by the alarm level module 164.

The present invention may be a system, a method, and/or a computer program product at any possible technical detail level of integration that incorporates the features discussed herein including condition indicator value determinations in combination with M out of N alarm logic to increase machine diagnostic reliability, reduce alarms significantly without increasing the risk of missing defects, to solve more difficult cases, to provide more precise recommendations to customers. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hard ware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The descriptions of the various embodiments herein have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. An auto-diagnosis system for executing a volume of machine health monitoring of one or more machine parts by an analysis of measurements of the one or more machine parts to detect defects therein as early as possible, the auto-diagnosis system comprising:
   at least one sensor in communication with the one or more machine parts;
   at least one processor; and
   at least one memory storing thereon software for an auto-diagnosis alarm handling of the one or more machine parts, the software comprising at least an alarm level module being executable by the at least one processor to cause the auto-diagnosis system to:
   set, by the alarm level module, alarm levels for each measurement point of the one or more machine parts based on a mean of a group of condition indicator values and a predetermined number of standard deviations above the mean,
   detect, by the alarm level module, an alarm with respect to the alarms levels and the measurements of the one or more machine parts provided by the at least one sensor,
   automatically adjust, by the alarm level module, an alarm level corresponding to the alarm, and
   automatically adjust, by the alarm level module, the alarm level to a new state based on the measurements respective to the alarm.

2. The auto-diagnosis system of claim 1, wherein the alarm level module sets the alarm levels after a learning or testing time period.

3. The auto-diagnosis system of claim 1, wherein the alarm level module utilizes M out of N alarm logic to detect the alarm.

4. The auto-diagnosis system of claim 1, wherein the alarm level module adjusts the alarm level to the new state based on the mean of the group of the condition indicator values plus a predetermined number of standard deviations above that mean.

5. The auto-diagnosis system of claim 1, wherein the auto-diagnosis system executes an analysis to determine whether a defect is present with respect to the alarm.

6. The auto-diagnosis system of claim 5, wherein the alarm level module adjusts the alarm level to the new state when maintenance has been performed on the one or more machine parts and a defect has been eliminated.

7. The auto-diagnosis system of claim 1, wherein the one or more modules comprise a machine part module that monitors kinematics of the one or more machine parts, the kinematics being utilized to determine defect frequencies of the measurements of the one or more machine parts.

8. The auto-diagnosis system of claim 1, wherein the one or more modules comprise a diagnosis rules module that determines and stores diagnosis rules based on generating a condition indicator value for each defect and in combination with amplitudes of the measurements of the one or more machine parts at defined frequencies based on kinematics.

9. The auto-diagnosis system of claim 1, wherein the one or more modules comprise a diagnosis trend module that determines and stores a series of condition indicator values outputted by the at least one processor upon a processing of historical measurement data stored in the at least one memory.

10. The auto-diagnosis system of claim 1, wherein a rotating machinery of a wind turbine system or a locomotive system comprise the one or more machine parts.

11. An auto-diagnosis method for executing a volume of machine health monitoring of one or more machine parts by an analysis of measurements of the one or more machine parts to detect defects therein as early as possible, the auto-diagnosis method implemented by an auto-diagnosis system comprising at least one sensor in communication with the one or more machine parts, at least one processor, and at least one memory storing thereon software for an auto-diagnosis alarm handling of the one or more machine parts, the software comprising at least an alarm level module being executable by the at least one processor to cause the auto-diagnosis system to implement the auto-diagnosis method comprising:

setting, by the alarm level module, alarm levels for each measurement point of the one or more machine parts based on a mean of a group of condition indicator values and a predetermined number of standard deviations above the mean, detecting, by the alarm level module, an alarm with respect to the alarms levels and the measurements of the one or more machine parts provided by the at least one sensor, automatically adjusting, by the alarm level module, an alarm level corresponding to the alarm, and automatically adjusting, by the alarm level module, the alarm level to a new state based on the measurements respective to the alarm.

12. The auto-diagnosis method of claim 11, wherein the alarm level module sets the alarm levels after a learning or testing time period.

13. The auto-diagnosis method of claim 11, wherein the alarm level module utilizes M out of N alarm logic to detect the alarm.

14. The auto-diagnosis method of claim 11, wherein the alarm level module adjusts the alarm level to the new state based on the mean of the group of the condition indicator values plus a predetermined number of standard deviations above that mean.

15. The auto-diagnosis method of claim 11, wherein the auto-diagnosis system executes an analysis to determine whether a defect is present with respect to the alarm.

16. The auto-diagnosis method of claim 15, wherein the alarm level module adjusts the alarm level to the new state when maintenance has been performed on the one or more machine parts and a defect has been eliminated.

17. The auto-diagnosis method of claim 11, wherein the one or more modules comprise a machine part module that monitors kinematics of the one or more machine parts, the kinematics being utilized to determine defect frequencies of the measurements of the one or more machine parts.

18. The auto-diagnosis method of claim 11, wherein the one or more modules comprise a diagnosis rules module that determines and stores diagnosis rules based on generating a condition indicator value for each defect and in combination with amplitudes of the measurements of the one or more machine parts at defined frequencies based on kinematics.

19. The auto-diagnosis method of claim 11, wherein the one or more modules comprise a diagnosis trend module that determines and stores a series of condition indicator values outputted by the at least one processor upon a processing of historical measurement data stored in the at least one memory.

20. The auto-diagnosis method of claim 11, wherein a rotating machinery of a wind turbine system or a locomotive system comprise the one or more machine parts.

\* \* \* \* \*